US011439901B2

(12) United States Patent
Goldman

(10) Patent No.: US 11,439,901 B2
(45) Date of Patent: Sep. 13, 2022

(54) APPARATUS AND METHOD OF OBTAINING DATA FROM A VIDEO GAME

(71) Applicant: Sony Interactive Entertainment Inc., Tokyo (JP)

(72) Inventor: Daniel Goldman, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 347 days.

(21) Appl. No.: 16/731,251

(22) Filed: Dec. 31, 2019

(65) Prior Publication Data

US 2020/0215434 A1 Jul. 9, 2020

(30) Foreign Application Priority Data

Jan. 4, 2019 (GB) .................................... 1900114

(51) Int. Cl.
*A63F 13/00* (2014.01)
*A63F 13/428* (2014.01)
(Continued)

(52) U.S. Cl.
CPC .......... *A63F 13/428* (2014.09); *A63F 13/213* (2014.09); *A63F 13/58* (2014.09);
(Continued)

(58) Field of Classification Search
CPC ...... A63F 13/428; A63F 13/58; A63F 13/537; A63F 13/56; A63F 13/577; A63F 13/87;
(Continued)

(56) References Cited

U.S. PATENT DOCUMENTS 10,521,865 B1* 12/2019 Spader .................. G06K 9/627
2013/0217502 A1* 8/2013 Takahashi ............. A63F 13/327
463/42

(Continued)

OTHER PUBLICATIONS

Jimmy Russo, "Apex Legends: Not All Character Hitboxes are Created Equally", Feb. 26, 2019, apex.tracker.gg, <https://apex.tracker.gg/article/10/apex-legends-not-all-character-hitboxes-are-c> (Year: 2019).*

(Continued)

*Primary Examiner* — Justin L Myhr
(74) *Attorney, Agent, or Firm* — Matthew B. Dernier, Esq.

(57) ABSTRACT

A method of obtaining data from a video game includes: inputting a video image of the video game comprising at least one avatar, detecting a pose of the avatar in the video image, assigning one or more avatar-status boxes to one or more portions of the avatar, determining, based on the pose of the avatar, a position of at least one avatar-status box with respect to the avatar using a correlation between avatar poses and avatar-status boxes, producing avatar-status data for the avatar indicative of the position of the at least one avatar-status box with respect to the avatar in the video image, generating one or more indicator images for the avatar in accordance with the avatar-status data, and augmenting the video image of the video game comprising at least the avatar with one or more of the indicator images in response to the pose of the avatar, in which the step of determining the position of the at least one avatar-status box with respect to the avatar includes providing, to a correlation unit trained to determine correlations between avatar poses and avatar-status boxes, an input comprising at least data indicative of the pose of the avatar, and obtaining from the correlation unit data indicative of a position of the at least one avatar-status box with respect to the avatar, responsive (Continued)

to that input, and each avatar-status box has a corresponding classification indicative of a type of in-game interaction associated with the avatar-status box.

12 Claims, 7 Drawing Sheets

(51) Int. Cl.
  *A63F 13/213*    (2014.01)
  *A63F 13/58*    (2014.01)
  *G06T 7/73*    (2017.01)
  *G06K 9/62*    (2022.01)
  *G06T 11/00*    (2006.01)
  *G06V 20/40*    (2022.01)

(52) U.S. Cl.
  CPC .............. *G06K 9/6256* (2013.01); *G06T 7/74* (2017.01); *G06T 11/00* (2013.01); *G06V 20/41* (2022.01); *G06T 2207/10016* (2013.01); *G06T 2207/20081* (2013.01)

(58) Field of Classification Search
  CPC ...... G02B 2027/014; G02B 2027/0141; G06T 13/40; G06T 7/74; G06V 40/103; G06V 40/28; H04N 7/157
  See application file for complete search history.

(56) References Cited

U.S. PATENT DOCUMENTS

| | | | |
|---|---|---|---|
| 2017/0228600 A1* | 8/2017 | Syed | G06V 20/62 |
| 2018/0214767 A1 | 8/2018 | Oh | |
| 2019/0009178 A1* | 1/2019 | Nakagawa | A63F 13/35 |
| 2020/0218901 A1* | 7/2020 | Elder | G06V 10/82 |

OTHER PUBLICATIONS

Combined Search and Examination Report for corresponding Application No. GB1900114.8, 6 pages, dated Jun. 24, 2019.

ZeroMayCry, "Knowledge is Power! A tutorial on Hitboxes and Hurtboxes! Fighting Game Glossary Ep 2—Boxes", YouTube, available from https://www.youtube.com/watch?v=zWUphi6qMnl, see 1:00-4:10, 2 pages, Apr. 21, 2017.

Zoombapup, "Running MaskRCNN and OpenPose on a short Fortnite Clip", YouTube, available from http://www.youtube.com/watch?v=reoTQmEkMnY, see 2:24-3:12, 2 pages, Nov. 12, 2018.

* cited by examiner

APPARATUS AND METHOD OF OBTAINING DATA FROM A VIDEO GAME

BACKGROUND OF THE INVENTION

Field of the Invention

The present disclosure relates to an apparatus and method of obtaining data from a video game.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Access to an executable program associated with a computer game is typically required in order to obtain data regarding execution of the computer game. In some circumstances game developers may allow third parties to openly access source code associated with an executable computer program (open-source). However, for some computer games the associated source code is not accessible to third parties (closed-source), in which case third parties are unable to inspect the source code to gain an understanding of the execution of the computer game. Even for the case where the source code associated with an executable computer program is published for access by third parties, software reverse engineering techniques are required in order for a software developer to extract the relevant information. As a result conventional techniques for obtaining data regarding software execution from a computer game require a manual examination of the source code for each computer game.

It is therefore desirable to obtain data from video games without having to manually access and reverse engineer the source code.

It is in this context that the present invention arises.

SUMMARY OF THE INVENTION

In one example arrangement, there is provided a method of obtaining data from a video game in accordance with claim 1.

In another example arrangement, there is provided a method of training a correlation processor to determine correlations between avatar poses and avatar-status boxes in accordance with claim 10.

In another example arrangement there is provided computer software which, when executed by a computer, causes the computer to perform the above methods, and a non-transitory machine readable medium which stores such computer software.

In another example arrangement, there is provided an apparatus adapted to obtain data from a video game in accordance with claim 12.

In another example arrangement, there is provided an apparatus adapted to train a correlation unit to correlate avatar poses and avatar-status boxes in accordance with claim 13.

Various other aspects and features of the present disclosure are defined in the appended claims and within the text of the accompanying description.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
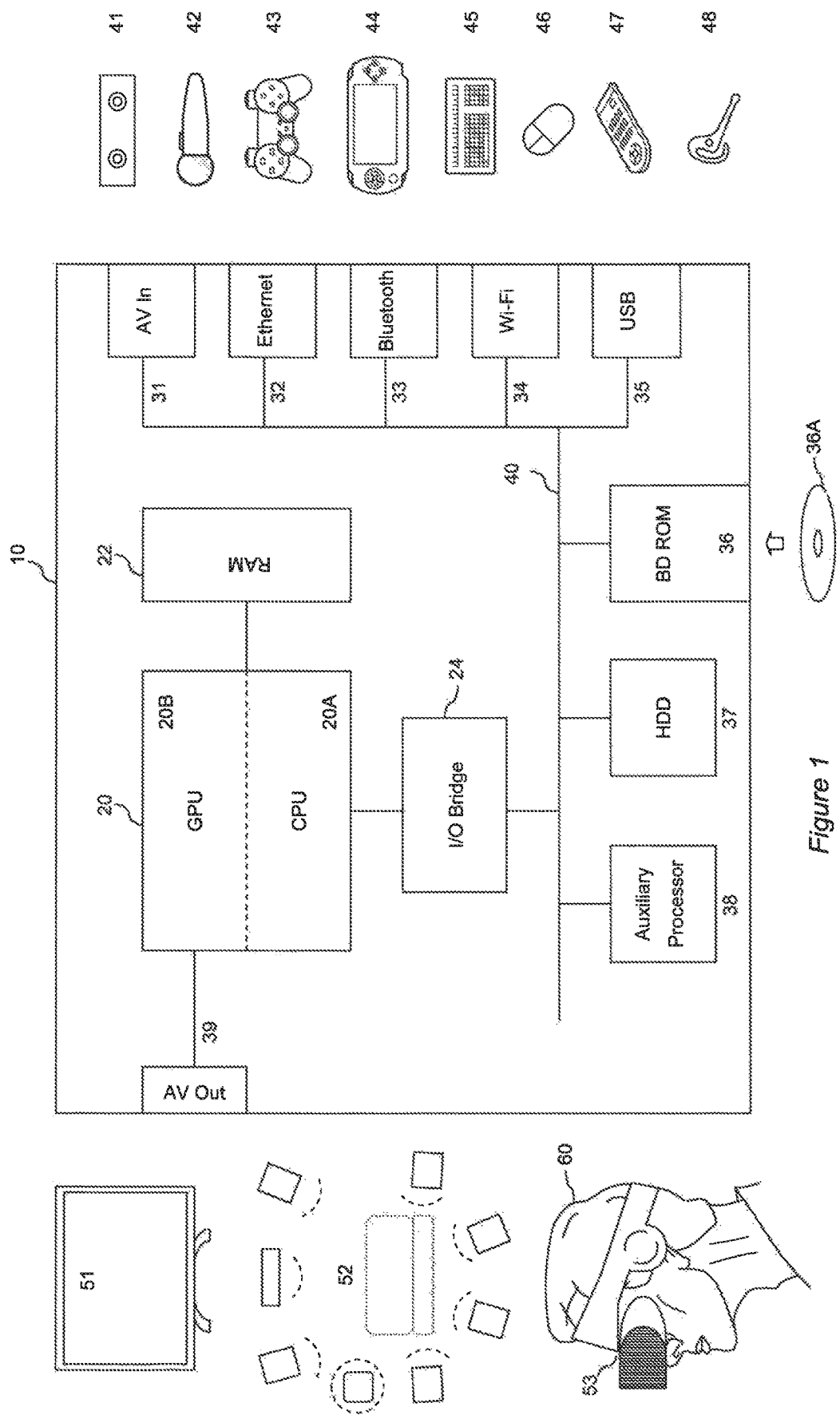
FIG. 1 is a schematic diagram illustrating a computer game processing apparatus.

Referring now to the drawings, wherein like reference numerals designate identical or corresponding parts throughout the several views, FIG. 1 schematically illustrates the overall system architecture of a computer game processing apparatus such as the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-Ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

FIG. 1 therefore provides an example of a computer game processing apparatus configured to execute an executable program associated with a computer game and generate a sequence of video images for output in accordance with an execution state of the computer game.

Figure 2:
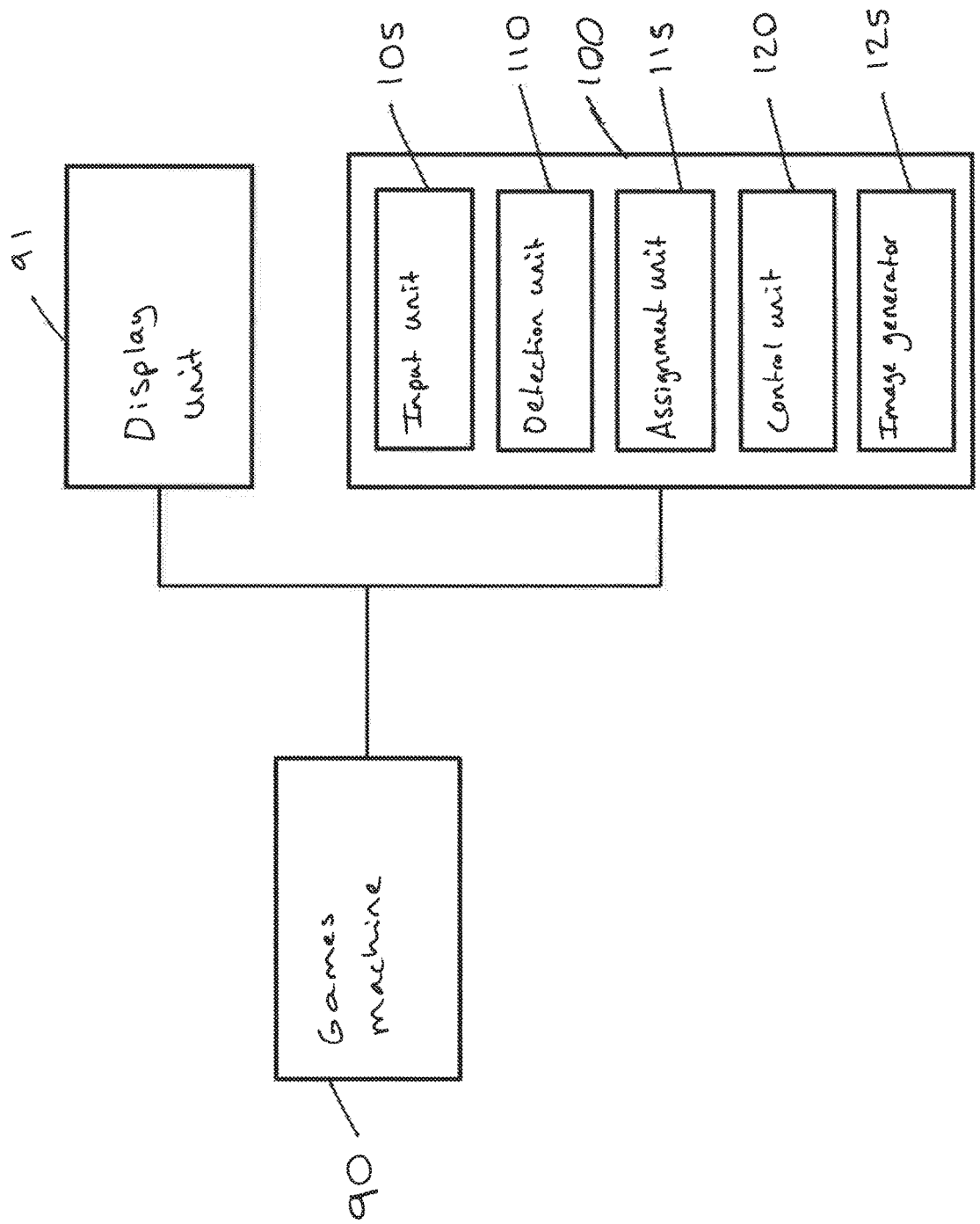
FIG. 2 is a schematic diagram illustrating an apparatus adapted to obtain data from a computer game.

Referring now to FIG. 2, in embodiments of the disclosure an apparatus 100 adapted to obtain data from a video game comprises an input unit 105 configured to obtain a video image of the video game comprising at least one avatar, a detection unit 110 configured to detect a pose of the avatar in the video image, an assignment unit 115 configured to assign one or more avatar-status boxes to one or more portions of the avatar, a control unit 120 configured to determine, based on the pose of the first avatar, a position of at least one avatar-status box with respect to the avatar using a correlation between avatar poses and avatar-status boxes, and to produce avatar-status data for the avatar indicative of the position of the at least one avatar-status box with respect to the avatar, and an image generator 125 configured to generate one or more indicator images for the avatar in accordance with the avatar-status data, and to augment the video image of the video game comprising the avatar with one or more of the indicator images in response to the pose of the avatar.

A games machine 90 is configured to execute an executable program associated with a computer game and generate a sequence of video images for output. The computer game processing apparatus illustrated in FIG. 1 provides an example configuration of the games machine 90. The games machine 90 outputs the video images and optionally audio signals to a display unit 91 via a wired or wireless communication link (such as WiFi® or Bluetooth® link) so that video images of a user's gameplay can be displayed. The sequence of video images output by the games machine 90 can be obtained by the apparatus 100 which operates under the control of computer software which, when executed by a computer or processing element, causes the apparatus 100 to carry out the methods to be discussed below.

In some examples, the apparatus 100 is provided as part of the games machine 90 which executes the executable program associated with the computer game. Alternatively, the games machine 90 may be provided as part of a remote computer games server and the apparatus 100 may be provided as part of a user's home computing device.

In embodiments of the disclosure, the input unit 105 of the apparatus 100 receives video images in accordance with the execution of the executable program by the games machine 90. Using one or more of the video images as an input the detection unit 110 can detect a pose of an avatar included in a scene represented in a video image.

During gameplay the avatar can interact with various elements of the in-game environment, and the in-game interactions of the avatar may be controlled by the executable program on the basis of one or more avatar-status boxes defined by the executable program associated with the video game. The executable program may define a plurality of respective avatar-status boxes and associate one or more of the avatar-status boxes with the avatar in the video image. For example, the executable program may define one avatar-status box that is mapped to the avatar's torso and another avatar-status box that is mapped to the avatar's head, such that one avatar-status box has a position that is determined based on the position of the avatar's torso and the other avatar-status box has a position that is determined based on the position of the avatar's head. As such, a given avatar-status box associated with the avatar can move in correspondence with a movement of a given portion of the avatar's body. A position of an avatar-status box mapped to a portion of an avatar can thus vary in accordance with the position of the avatar in the in-game environment, and a position of the avatar-status box with respect to another interactive element in the in-game environment, such as another avatar-status box of another avatar, can be used by the executable program to determine whether the avatar is involved in an in-game interaction.

For example, in a one-on-one combat game in which two avatars attack each other using portions of the body of the avatar (such as a hand, arm, foot, leg and/or head) the executable program of the video game may define respective avatar-status boxes for respective portions of the avatar's body. In this case, the executable program may define one or more avatar-status boxes associated with the first avatar which move in correspondence with the movements of the first avatar. Similarly, the executable program may define one or more avatar-status boxes associated with the second avatar which move in correspondence with the movements of the second avatar. When the executable program determines that an avatar-status box associated with the first avatar overlaps or collides with an avatar-status box assigned to the second avatar, this provides an indication of an occurrence of an in-game interaction (an in-game event) between the first avatar and the second avatar. Hence, for each avatar-status box the executable program defines a corresponding position and size of the avatar-status box and when a portion of the in-game environment occupied by one avatar-status box coincides with a portion of the in-game environment occupied by another avatar-status box, the result is an in-game interaction which is dependent upon the type (classification) of the two coincident avatar-status boxes.

In response to determining that two avatar-status boxes overlap with each other in the in-game environment, the execution state of the video game can be updated which is reflected in the video images output as a result of the execution of the executable program. Specifically, the execution state of the video game can be updated in dependence upon the type (classification) of the overlapping avatar-status boxes and the time at which the avatar-status boxes overlap, and the in-game interaction is thus represented in the sequence of video images generated as a result of the execution of the computer program.

In a specific example, the avatar-status box associated with the first avatar may be classified as a "hit-box" and mapped for example to the first avatar's leg, foot, arm or hand. The avatar status-box associated with the second avatar may be classified as a "hurt-box" and mapped to the second avatar's head or torso, for example. A "hit-box" is a type of avatar-status box associated with an in-game interaction in which an avatar performs an attack operation to inflict damage upon another avatar or another in-game element, and the "hurt-box" is a type of avatar-status box associated with an in-game interaction in which an avatar is targeted by an attack operation. As such, a "hit-box" is typically mapped to a portion of the avatar capable of performing an attack operation (e.g. performing an in-game hit) such as a portion of a limb of the avatar, and a "hurt-box" is typically mapped to a portion of the avatar capable of being attacked (e.g. receiving a hit operation from an element in the video game) such as a portion of a torso of the avatar or a portion of a limb of the avatar. When an avatar status-box classified as a "hit-box" overlaps with an avatar status-box classified as a "hurt-box" in the in-game environment, the avatar associated with the "hit-box" can interact with another avatar, or in game-element, associated with the "hurt-box" to inflict damage upon the other avatar or in-game element.

It will be appreciated that the movements of one or more portions of the first avatar can be controlled by a first user based on a user input provided via a user interface device such as the handheld videogame controller 43 connected to the games machine 90 by a wired or wireless communication link. Similarly, the movements of one or more portions of the second avatar may be controlled by a second user based on a user input provided via a user interface device such as the handheld videogame controller 43, or alternatively the movements of at least one of the first avatar and the second avatar may be automatically controlled by the executable program such that at least one of the avatars is a video game bot.

The executable program may define a range of different types of avatar-status boxes that may be mapped to a portion of the avatar, including:
  i. a hit box indicative that a portion of an avatar pose can inflict an in-game hit-interaction on an element of the video game;
  ii. a hurt box indicative that a portion of an avatar pose can receive an in-game hit-interaction from the element of the video game;
  i. an armour box indicative that a portion of an avatar pose can not be hurt;
  ii. a throw box indicative that at least part of an avatar pose can engage with a target to throw the target;
  iii. a collision box indicative that a portion of an avatar pose can collide with a target;
  iv. a proximity box indicative that a portion of an avatar pose can be blocked by an opponent; and
  v. a projectile box indicative that a portion of an avatar pose comprises a projectile.

In embodiments of the disclosure, the assignment unit 115 is configured to assign one or more avatar-status boxes to one or more portions of the avatar included in the video image output by the games machine 90. The techniques of the present disclosure are capable of correlating avatar-status boxes having any of the above mentioned classifications with avatar poses, and the assignment unit 115 can assign one or more avatar-status boxes to one or more portions of the avatar, in which each avatar-status box has a corresponding classification selected from the list consisting of: a hit box; a hurt box; an armour box; a throw box; a collision box; a proximity box; and a projectile box.

The assignment unit 115 may assign a plurality of avatar-status boxes to the avatar, such that a first avatar-status box is assigned to a first portion of the avatar and a second avatar-status box is assigned to a second portion of the avatar. In the case where the avatar is a humanoid avatar, the first or second portion may correspond to one of a hand, arm, foot, leg, head or torso of the avatar. In some cases, the assignment unit 115 may assign avatar-status boxes having different classifications, where a classification of an avatar-status box is indicative of a type of in-game interaction associated with the avatar-status box. The assignment unit 115 can be configured to assign a first avatar-status box having a first classification to the first portion of the avatar and may assign a second avatar-status box having a second classification to the second portion of the avatar. In cases where a portion of the avatar is capable of participating in more than one-type of in-game interaction, the assignment unit 115 may assign a first avatar-status box having a first classification and a second avatar-status box having a second classification to that same portion of the avatar, and may do so at the same time or at different times. An example of such a portion of the avatar may be the avatar's leg, which is capable of performing an attack operation to inflict damage on an opponent and is also capable of being the victim of an attack by an opponent in which the avatar suffers damage. As such, the apparatus 100 can receive a video image of the video game and one or more avatar-status boxes can be assigned to the avatar in the video image by the assignment unit 115. Each avatar in the video image may be assigned a plurality of avatar-status boxes, each avatar-status box having a corresponding classification selected from a plurality of classifications.

In embodiments of the disclosure, the detection unit 110 is configured to detect a pose of the first avatar in the video image by performing an analysis of an input video image including the avatar using a feature point detection algorithm to detect features of the avatar. For example, the detection unit 110 may use a library for avatar keypoint detection, such as OpenPose, from which a pose of an avatar in the video image can be estimated, as discussed in detail below. In this way, the detection unit 110 can detect a pose of the avatar in a video image and can detect changes in the pose of the avatar by analysing each video image of a sequence of video images. Hence more generally, the detection circuitry 110 is configured to detect the pose of the avatar in the video image and to generate information indicative of the pose of the avatar.

In embodiments of the disclosure, the control unit 120 is configured to determine a position of at least one avatar-status box with respect to the avatar based on the pose of the avatar using a correlation between avatar poses and avatar-status boxes, and to produce avatar-status data for the avatar indicative of the position of the at least one avatar-status box with respect to the avatar. Using the detected avatar pose and the one or more avatar-status boxes assigned to the avatar, the control unit 120 can be configured to determine a position of at least one of the avatar-status-boxes with respect to the first avatar using the correlation between avatar poses and avatar-status boxes, wherein the correlation is generated by a machine learning system having been trained using video images. The control unit 120 can access a model that has been trained using machine learning techniques to correlate avatar poses with avatar-status boxes. By providing information indicative of the pose of the avatar detected by the detection circuitry 110 to the model, a position of at least one of the avatar-status boxes with respect to the detected avatar pose can be determined. In other words, information indicative of the pose of the avatar detected by the detection circuitry 110 can be provided as an input to the model defining correlations between avatar poses and avatar-status boxes, and the model can thus determine a position of at least one of the avatar-status boxes with respect to the first avatar in the video image. For example, the correlation between avatar poses and avatar-status boxes may indicate that for a given avatar pose a given avatar-status box is expected to have a given position with respect to the given portion of the avatar to which it is assigned according to previous avatar poses and avatar-status boxes observed when training the model to correlate avatar poses and avatar-status boxes. Therefore, when the pose of the avatar detected by the detection unit 110 corresponds to the given avatar pose, the correlation defined by the model can be used to determine a position of at least one of the avatar-status boxes with respect to the avatar. In this way, the apparatus 100 can assign one or more avatar-status boxes to an avatar and a position of at least one of the avatar-status boxes with respect to a pose of the avatar can be determined using the correlation. The avatar may be capable of adopting a plurality of respective avatar poses and for a detected avatar pose the correlation can be used to determine a position of an avatar-status box with respect to the avatar pose by providing information indicative of the detected avatar pose as an input to the model.

For example, at its simplest the model defining the correlation between avatar poses and avatar-status boxes may comprise information indicating a correspondence between a first avatar pose and a position of one or more avatar-status boxes associated with the first avatar pose, and a correspondence between a second avatar pose and a position of one or more avatar-status boxes associated with the second avatar pose. The first avatar pose may correspond to an upright defensive-stance, and the second avatar pose may correspond to an upright attack-stance in which at least one of the avatar's limbs protrudes in a direction away from the torso of the avatar, for example. For the first avatar pose, the model defines a plurality of avatar-status boxes each having a size and a position with respect to the first avatar. In some cases the model may define a plurality of avatar-status boxes that all have the same classification (e.g. for the first avatar pose all of the avatar-status boxes may have a first classification corresponding to a "hurt-box" classification). Alternatively, some of the avatar-status boxes may have a first classification and some of the avatar-status boxes may have a second classification, wherein the first classification is different to the second classification and the classification is indicative of a type of in-game interaction associate with the avatar-status box. For the second avatar pose the model may similarly define a plurality of avatar-status boxes each having a defined position with respect to the first avatar and each avatar-status box having a corresponding classification. As such, the model may comprise information defining avatar-status boxes each having a corresponding classification and at its simplest each avatar-status box is either classified as a "hurt-box" or a "hit-box". It will be appreciated that other classifications of avatar-status boxes can be defined by the model. In this way, for a given avatar pose some of the avatar-status boxes may have a first classification corresponding to a "hurt-box" and some of the avatar-status boxes may have a second classification corresponding to a "hit-box". When the pose of the avatar detected by the detection unit 110 corresponds to one of the avatar poses defined by the model, the correlation between avatar poses and the avatar-status boxes defined by the model can be used to determine a position of at least one of the avatar-status boxes assigned to a portion of the avatar by the assignment unit 105. Hence a position of an avatar-status box with respect to a portion of the avatar (such as a position of a "hit-box" or "hurt-box" with respect to a limb of the avatar) can be determined based on a detection of the pose of the avatar in the video image.

Consequently, using just a video image as an input to the apparatus 100, one or more avatar-status boxes can be assigned to the avatar in the video image, and a position of one or more of the avatar-status boxes with respect to the avatar can be determined using the model defining the above mentioned correlation between avatar poses and the avatar-status boxes, and therefore a position of an avatar-status box can be determined that at least approximates a position of an avatar-status box as defined by the executable program associated with the video game. This provides a technique whereby an analysis of a video image of a video game can allow positions of avatar-status boxes associated with an avatar to be determined using video images output as a result of the execution of the executable program without requiring access to the source code or reverse engineering of the source code.

In embodiments of the disclosure the control unit 120 is configured to produce avatar-status data for the avatar indicative of the position of at least one avatar-status box with respect to the avatar. Upon determining a position of an avatar-status box with respect to the avatar for the detected pose of the avatar, the control unit 120 can produce avatar-status data for the avatar to record the determined position of the avatar-status box with respect to the avatar for the detected avatar pose. For example, the avatar-status data for the avatar may comprise data indicative of a first pose of the avatar and a position of each avatar-status box with respect to the avatar for the first pose of the avatar. Similarly, the avatar-status data for the avatar may comprise data indicative of a second pose of the avatar and a position of each avatar-status box with respect to the avatar when the avatar adopts the second pose. Positions of respective avatar-status boxes can be stored in association with a respective avatar pose, and avatar-status box position information can be stored for a plurality of respective avatar poses.

In embodiments of the disclosure, the image generator 125 is configured to generate one or more indicator images for the avatar in accordance with the avatar-status data, and to augment the video image of the video game comprising at least the first avatar with one or more of the indicator images in response to the pose of the avatar. The avatar-status data comprises data indicative of the position an avatar-status box with respect to the avatar for an avatar pose, which can be used by the image generator 125 in order to generate one or more indicator images for the avatar. As such, indicator images can be generated in dependence upon the avatar-status data produced by the control unit 120 and the indicator images can be used to augment the video image of the video game comprising at least the first avatar. The video image can be augmented in response to the detected pose of the avatar in the video image using the indicator images so that movement of the avatar in the video image is accompanied by movement of the indicator images.

Figure 3:
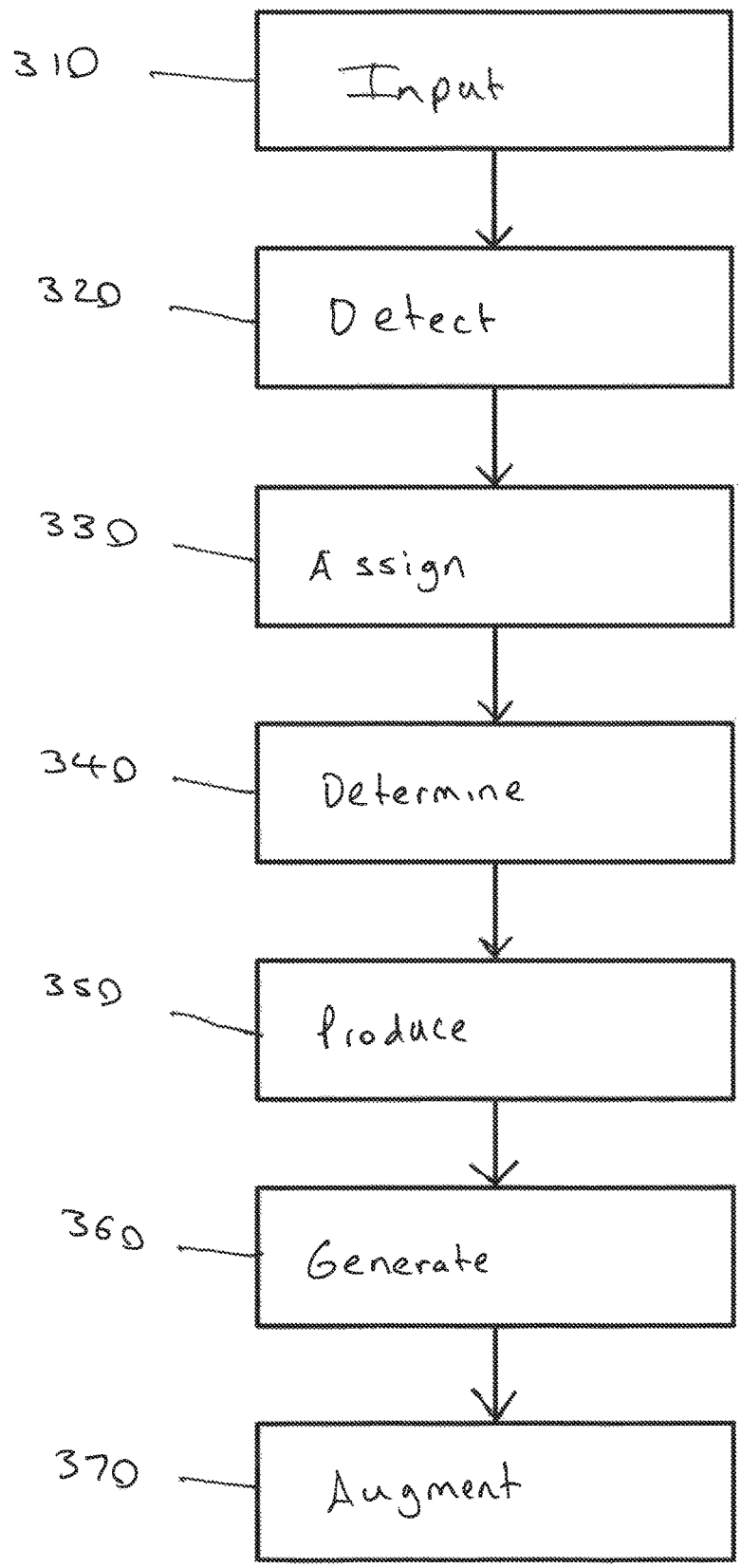
FIG. 3 is a schematic flowchart illustrating a method of obtaining data from a computer game.

Referring to FIG. 3, there is provided a schematic flowchart in respect of a method of obtaining data from a video game, comprising:

inputting (at a step 310) a video image of the video game comprising at least one avatar;

detecting (at a step 320) a pose of the avatar in the video image;

assigning (at a step 330) one or more avatar-status boxes to one or more portions of the avatar;

determining (at a step 340), based on the pose of the avatar, a position of at least one avatar-status box with respect to the avatar using a correlation between avatar poses and avatar-status boxes;

producing (at a step 350) avatar-status data for the avatar indicative of the position of the at least one avatar-status box with respect to the avatar in the video image;

generating (at a step 360) one or more indicator images for the avatar in accordance with the avatar-status data; and augmenting (at a step 370) the video image of the video game comprising at least the avatar with one or more of the indicator images in response to the pose of the avatar.

The method of obtaining data from a video game illustrated in FIG. 3 can be performed by an apparatus such as the apparatus 100 illustrated in FIG. 2 operating under the control of computer software.

Figure 4A:
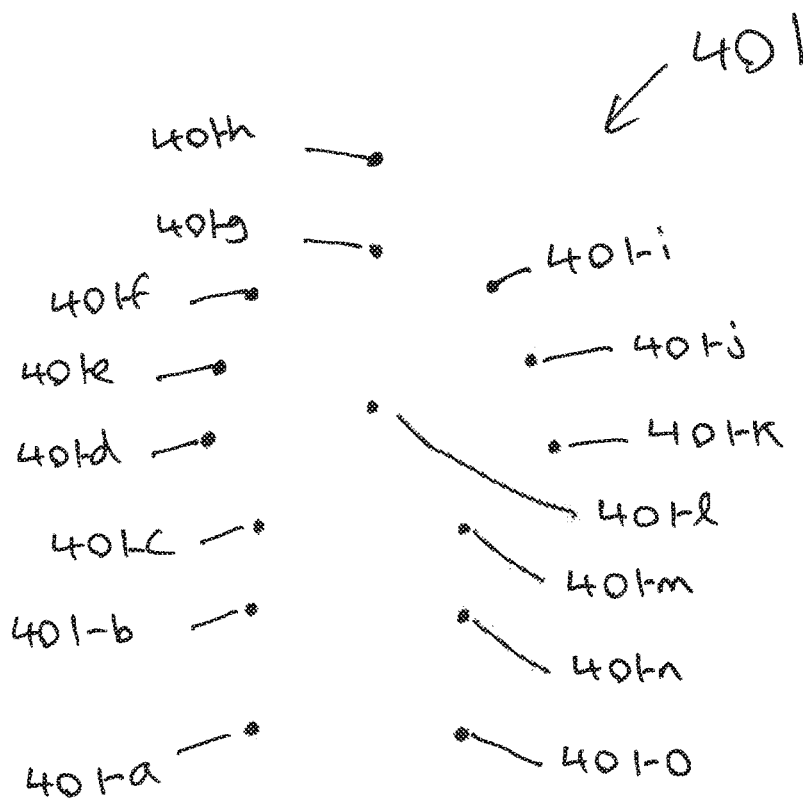
FIG. 4*a* schematically illustrates a plurality of keypoint features detected for an avatar in a video image.
Figure 4B:
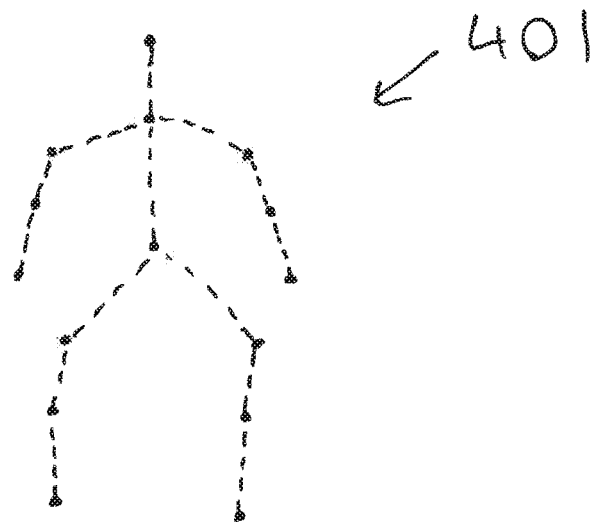
FIG. 4*b* schematically illustrates a pose of an avatar that is estimated based on the relative positions of the keypoint features.

FIG. 4a schematically illustrates a plurality of keypoint features detected for an avatar in a video image. In embodiments of the disclosure, detecting the pose of the avatar in the video image comprises: analysing the video image of the video game using an algorithm trained on skeletal models; and selecting one avatar pose from a plurality of avatar poses based on one or more from the list consisting of: an angle of a limb of the avatar with respect to a torso of the avatar; a degree of extension of the limb of the avatar; and a distance between a position of a centre of gravity of the avatar and a position of a predetermined portion of the limb of the avatar. The video image can be analysed by the detection circuitry 110 using a model-based pose estimation algorithm so as to detect keypoint features 401a-o of the avatar 401 such as the torso, hand, face and foot of the avatar from which the pose of the avatar 401 can be estimated. The detection circuitry 110 can analyse the video image using a keypoint detection library to detect keypoint features, and using an algorithm trained on skeletal models different poses adopted by the avatar can be detected. FIG. 4b schematically illustrates a pose of the avatar 401 that is estimated based on the keypoint features detected by the detection circuitry 110.

Based on one or more properties detected by the detection unit 110 for the avatar pose included in the video image, the detection unit 110 can select one avatar pose from a plurality of predetermined avatar poses. An angle of a limb of the avatar 400 with respect to the torso of the avatar 400 may be used to select one avatar pose from a plurality of avatar poses. For example, the detection unit 110 may detect the pose of the avatar in the video image and select either a first avatar pose or a second avatar pose from the plurality of predetermined avatar poses based on whether the angle between the limb and the torso exceeds a predetermined threshold value. In this way, predetermine threshold value for an angle between a first portion of the avatar and a second portion of the avatar can be used to determine which avatar pose from the plurality of avatar poses corresponds to the avatar pose adopted by the avatar in the video image. In some examples, when an angle between an arm of the avatar and the torso of the avatar is less than or equal to the predetermined threshold angle (e.g. 45, 50, 55, 60, 65, 70, 75, 80, 85 or 90 degrees) this indicates that the avatar pose corresponds to a first avatar pose, and when the angle between the arm of the avatar and the torso of the avatar exceeds the predetermined threshold angle this indicates that the avatar pose corresponds to a second avatar pose. For the case where the angle between the arm of the avatar and the torso of the avatar is less than or equal to the predetermined threshold, the detection unit 110 may select the first avatar pose which corresponds to a upright resting pose which is adopted by the avatar by default in the absence of a user input. Similarly, for the case where the angle between the arm of the avatar and the torso of the avatar exceeds the predetermined threshold the detection circuitry may select the second avatar pose which corresponds to an upright attack pose which is adopted by the avatar in response to a user input instructing the avatar to perform an attack operation. Hence more generally, a plurality of predetermined threshold values may be used for comparison with the angle between the limb of the avatar and the torso of the avatar, such that one of the plurality of avatar poses can be selected according to whether or not the measured angle exceeds a threshold angle associated with a given avatar pose.

Alternatively or in addition, a degree of extension of the limb of the avatar may be used to select one avatar pose from the plurality of avatar poses. A degree of extension of the limb with respect to the torso may be detected by detecting a position of a given portion of the limb (e.g. hand, elbow, foot or knee) with respect to a portion of the torso. When the distance between the given portion of the limb of the avatar and the portion of the torso of the avatar is less than or equal to a predetermined threshold distance, this may indicate that the avatar pose corresponds to a first avatar pose. Similarly, when the distance between the given portion and the portion of the torso of the avatar exceeds predetermined threshold distance, this may indicate that the avatar pose corresponds to a second avatar pose. In this case, the first avatar pose may correspond to the upright resting pose which is adopted by the avatar by default and the second avatar pose may correspond to the upright attack pose. A plurality of threshold distances can be used for comparison with the distance between the given portion of the limb of the avatar and the portion of the torso, as detected by the detection circuitry 110, and one of the plurality of avatar poses can be selected according to whether or not the distance exceeds a threshold distance associated with a given avatar pose. Similarly, the degree of extension of the limb of the avatar may be used to select one avatar pose from the plurality of avatar poses by measuring an angle associated with a joint of the avatar, such as the knee or elbow joint, for example. In this way, a predetermined threshold angle may be associated with at least one joint of the avatar and one avatar pose may be selected from the plurality of avatar poses in dependence upon whether the angle associated with the at least one joint of the avatar exceeds the predetermined threshold angle associated with that joint.

Alternatively or in addition, a distance between a position of a centre of gravity of the avatar and a position of a predetermined portion of the limb of the avatar may be used to select one avatar pose from the plurality of avatar poses. In this case, when a distance between the centre of gravity of the avatar and the predetermined portion of the limb of the avatar is less than or equal to a predetermined threshold distance, this may indicate that the avatar pose corresponds to a first avatar pose. Similarly, when the distance between the centre of gravity of the avatar and the predetermined portion of the limb of the avatar exceeds the predetermined threshold distance, this may indicate that the avatar pose corresponds to a first avatar pose. As such, a predetermined threshold distance may be used for comparison with a distance between the position of the centre of gravity of the avatar and a portion of the avatar such as the hand, elbow, foot or knee. Therefore, one avatar pose can be selected from the plurality of avatar poses in dependence upon whether or not the predetermined portion of the avatar is located further from the centre of gravity of the avatar than the predetermined threshold distance. For example, the first avatar pose may correspond to the upright resting pose which is adopted by the avatar by default and the second avatar pose may correspond to the upright attack pose in which a limb of the avatar is extended away from the torso of the avatar in order to attack another entity in the in-game environment.

Hence more generally, the detection circuitry 110 can be configured to detect an extent to which a given limb of the avatar is outstretched and an avatar pose can be selected from the plurality of predetermined avatar poses based on the a magnitude of a parameter detected for the given limb. The predetermined threshold angles and/or predetermined threshold distances discussed above can be used by the detection unit 110 to select one avatar pose from the plurality of avatar poses, wherein the plurality of avatar poses comprise: a first avatar pose corresponding to an upright posture of the avatar in which the arms of the avatar are proximate to the torso and the avatar's legs are approximately parallel to the length of the avatar's torso; and a second avatar pose corresponding to an upright posture of the avatar in which at least one arm or leg of the avatar protrudes in a direction away from the torso of the avatar. In some examples, the second avatar pose may correspond to an posture of the avatar in which a left arm of the avatar protrudes in a direction away from the torso of the avatar, a third avatar pose may correspond to a posture of the avatar in which a right arm of the avatar protrudes in a direction away from the torso of the avatar, a fourth avatar pose may correspond to a posture of the avatar in which a left leg of the avatar protrudes in a direction away from the torso of the avatar, and a fifth avatar pose may correspond to a posture of the avatar in which a right leg of the avatar protrudes in a direction away from the torso of the avatar. It will be appreciated that these respective avatar poses may be detected by the detection circuitry 110 by detecting one or more angles or distances associated with one of the left arm, right arm, left leg or left arm. Similarly, the plurality of avatar poses may comprise one or more avatar poses corresponding to avatar poses in which more than one limb protrudes away from the torso of the avatar.

It will be appreciated that the magnitude of the predetermined threshold angles and/or predetermined threshold distances used for determining an avatar pose may vary depending on the properties of the avatar. For example, the magnitude of the predetermined threshold angles and/or predetermined threshold distances may vary in dependence upon the height of the avatar, and/or a length of the avatar's limb, and/or a ratio of torso length to limb length. In this way, a first set of threshold values may be used for the threshold angles and/or distances for an avatar having a first height and a second set of threshold values may be used for the threshold angles and/or distances for an avatar having a second height.

In some examples, the detection unit 110 can be configured to categorise the one or more avatar poses of the plurality of avatar poses according to three possible categories: a first categorisation referred to as "startup pose"; a second categorisation referred to as "active pose"; and a third categorisation referred to as "recovery pose". The first categorisation corresponds to avatar poses in which the avatar adopts a default pose or a defensive pose (e.g. guard stance/boxing pose), for example in which the arms are proximate to the user's torso or head. The second categorisation corresponds to avatar poses in which at least one of the limbs protrudes away from the torso and the degree of extension of the at least one limb is greater than a predetermined percentage (e.g. 70% or 80%) of the maximum extension of the at least one limb. Alternatively or in addition to using the predetermined percentage of the maximum extension of the at least one limb, an angle of the at least one limb with respect to the torso or with respect to the horizontal may be used to determine whether an avatar pose is categorised as an "active pose" based on whether the angle exceeds a predetermined threshold value. As such, a detected avatar pose can be categorised as an "active pose" based on whether an angle associated with the avatar pose exceeds a predetermined angle with respect to at least one of the horizontal (e.g. with respect to the surface on which the avatar is standing) or the torso of the avatar. The third categorisation corresponds to avatar poses in which the avatar pose recovers from a second categorisation pose in order to return to a first categorisation pose. In other words, the third categorisation corresponds to avatar poses following a second categorisation avatar pose where the degree of extension of the at least one limb is now less than the predetermined percentage (e.g. 70% or 80%) of the maximum extension of the at least one limb.

It will be appreciated that the above categorisations may also be used for avatar poses that are not part of a predetermined set of poses (e.g. as predefined animation frames) but are generated or modified heuristically, e.g. according to a physics model.

For a typical in-game interaction in which the avatar attacks another avatar, the attack operation may be composed of at least a first avatar pose having the first categorisation ("startup pose"), followed by a second avatar pose having the second classification ("active pose"), then followed by a third avatar pose having the third categorisation ("recovery pose"). In this way an attack operation can be formed of a sequence of avatar poses comprising at least three respective avatar poses. For an avatar pose corresponding to the first categorisation, at least one of the avatar-status boxes assigned to the one or more portions of the avatar pose has a hurt-box classification indicating that a portion of the avatar pose can be hit as part of an in-game interaction. For an avatar pose corresponding to the second categorisation, at least one of the avatar-status boxes assigned to the one or more portions of the avatar pose has a hit-box classification indicating that a portion of the avatar pose can inflict a hit as part of an in-game interaction. For an avatar pose corresponding to the third categorisation, at least one of the avatar-status boxes assigned to the one or more portions of the avatar pose has a hurt-box classification indicating that a portion of the avatar pose can be hit as part of an in-game interaction. In a specific example, the avatar-status boxes corresponding to the avatar pose having the first categorisation each have a hit-box classification, indicating that the respective portions of the avatar are capable of being damaged by an in-game hit interaction, whereas for the avatar pose having the second categorisation at least one avatar-status box associated with the avatar's protruding limb has a hit-box classification, which means that the avatar pose having the second categorisation is capable of inflicting an in-game hit interaction via the hit-box when the region of space in the video game corresponding to the hit-box overlaps with a region of space in the video game corresponding to a hurt-box of another avatar or element in the video game. It will be appreciated that the value of the predetermined percentage of the maximum extension of the at least one limb may, which is used to determine whether a given avatar pose corresponds to an "active pose", may vary suitably depending on the properties of the avatar such as limb length or height, but typically a value in the range of 60%-90% of the maximum extension of the limb may be used.

In embodiments of the disclosure, augmenting the video image of the video game comprises: augmenting the video image with a first set of indicator images in response to a first avatar pose and augmenting the video image with a second set of indicator images in response to a second avatar pose, in which each indicator image corresponds to one avatar-status box. The image generator 125 can be configured to generate one or more indicator images for the first avatar in accordance with the avatar-status data, and one or more of the indicator images can be used to augment the video image of the video game. By augmenting the video image in accordance with the avatar-status data, the video image can be augmented with visual representations of the avatar-status boxes for which a position with respect to the avatar has been determined on the basis of the correlation between avatar poses and avatar-status boxes. An augmented image can thus be provided which can be viewed by a user or another person viewing the user's game play to visually inform an observer or a player of the position of the avatar-status boxes with respect to the avatar. For example, such augmented images may be provided for display to an audience viewing a game being played as part of an electronic sports (eSports) tournament. As discussed previously, an avatar in a video image can adopt a number of different poses in response to a user input that controls the configuration of the avatar. When the avatar pose has a "startup pose" categorisation, which corresponds to an upright defensive-stance, the one or more avatar-status boxes classified as "hit-boxes" can be used to augment the video image so as to illustrate the portions of the avatar which are capable of being hit as part of an in-game interaction. Similarly, other types of avatar-status boxes associated with in-game interactions in which the avatar is the victim of an attack, such as an "armour box" or a "collision box", can be used to augment the video image as appropriate.

When the avatar pose has an "active pose" categorisation, which corresponds to an avatar stance adopted as part of an attack action by the avatar, the one or more avatar-status boxes classified as "hit-boxes can be used to augment the video image, and in addition one or more avatar-status boxes associated with the protruding limb and classified as "hurt-boxes" can be used to augment the video image. As such, a portion of the video image corresponding to the outstretched limb of the avatar can be augmented with an indicator image corresponding to an avatar-status box having a "hit-box" classification. The portions of the avatar which are capable of being hit as part of an in-game interaction and the portions of the avatar which are capable of inflicting an in-game hit-interaction can be visually represented in the augmented video image. Similarly, other types of avatar-status boxes associated with in-game interactions in which the avatar inflicts an in-game hit-interaction upon an element in the video game, such as a projectile box indicative that at least part of the avatar pose comprises a projectile or a throw box indicative that at least part of the avatar pose can engage with an element to perform a throw operation, can be used to augment the video image as appropriate.

When the avatar pose has a "recovery pose" categorisation, which corresponds to an avatar stance adopted after an attack operation has been performed by the avatar, the one or more avatar-status boxes classified as "hit-boxes can be used to augment the video image and the one or more avatar-status boxes associated with the protruding limb and classified as "hurt-boxes" are no longer used to augment the video image. In this way, the portions of the avatar which are capable of being hit as part of an in-game interaction can be visually represented in the augmented video image.

The image generator 125 can be configured to augment the video image of the video game with one or more indicator images in response to the pose of the avatar. A first set of indicator images can be used to augment the video image in response to a detection that the avatar pose has the first categorisation, and a second set of indicator images can be used to augment the video image in response to a detection that the avatar pose has the second categorisation. This allows respective sets of indicator images to be associated with respective avatar poses based on a categorisation of an avatar pose. In response to a detection that the avatar has an avatar pose having the first categorisation, the image generator 125 can select the one or more indicator images corresponding to the first set of indicator images and the video image can be augmented in real-time to illustrate the location and the type of each avatar-status box for the avatar. In some examples, an indicator image corresponding to an avatar-status box having a first classification can be generated having a first colour, and an indicator image corresponding to an avatar-status box having a second classification can be generated having a second colour so that when the video image is augmented with the respective indicator images the different types of avatar-status boxes can easily be distinguished. For example, the hurt-boxes may be rendered in red whereas the hit-boxes may be rendered in green. Other colours may be used to visually represent the different types of avatar-status boxes in the augmented video image.

In embodiments of the disclosure, each avatar-status box is assigned to a portion of the avatar and each avatar-status box has a corresponding classification indicative of a type of in-game interaction associated with the avatar-status box. A plurality of avatar-status boxes may be assigned to the avatar, where one or more avatar-status boxes may be assigned to a given portion of the avatar. For example, an avatar-status box may be assigned to each portion of the avatar that is capable of inflicting an in-game hit interaction on an opponent or capable of receiving an in-game hit interaction from an opponent. As such, for portions of the avatar's body that have dual-capability, a first avatar-status box having a first classification and a second avatar-status box having a second classification may be assigned to the portion of the avatar's body, the first classification being different to the second classification. In this way, the portion of the avatar's body having dual capability can participate in two different types of in-game interaction via the two avatar-status box. Similarly, any number of avatar-status boxes may be assigned to a given portion of the avatar in dependence upon the number of types of interaction that portion is capable of participating in.

In embodiments of the disclosure, the classification of an avatar-status box is selected from the list consisting of:
i. a hit box indicative that a portion of an avatar pose can inflict an in-game hit-interaction on an element of the video game;
ii. a hurt box indicative that a portion of an avatar pose can receive an in-game hit-interaction from the element of the video game;
i. an armour box indicative that a portion of an avatar pose can not be hurt;
ii. a throw box indicative that at least part of an avatar pose can engage with a target to throw the target;

iii. a collision box indicative that a portion of an avatar pose can collide with a target;

iv. a proximity box indicative that a portion of an avatar pose can be blocked by an opponent; and v. a projectile box indicative that a portion of an avatar pose comprises a projectile.

In embodiments of the disclosure, assigning one or more avatar-status boxes to the first avatar comprises assigning at least a first avatar-status box and a second avatar-status box to a limb of the first avatar, in which first avatar-status box has a first classification and the second avatar-status box has a second classification, the first classification being different to the second classification, in which a classification of the first avatar-status box indicates that the first avatar-status box is a hit box and a classification of the second avatar status box indicates that the second avatar-status box is a hurt box.

Figure 5:
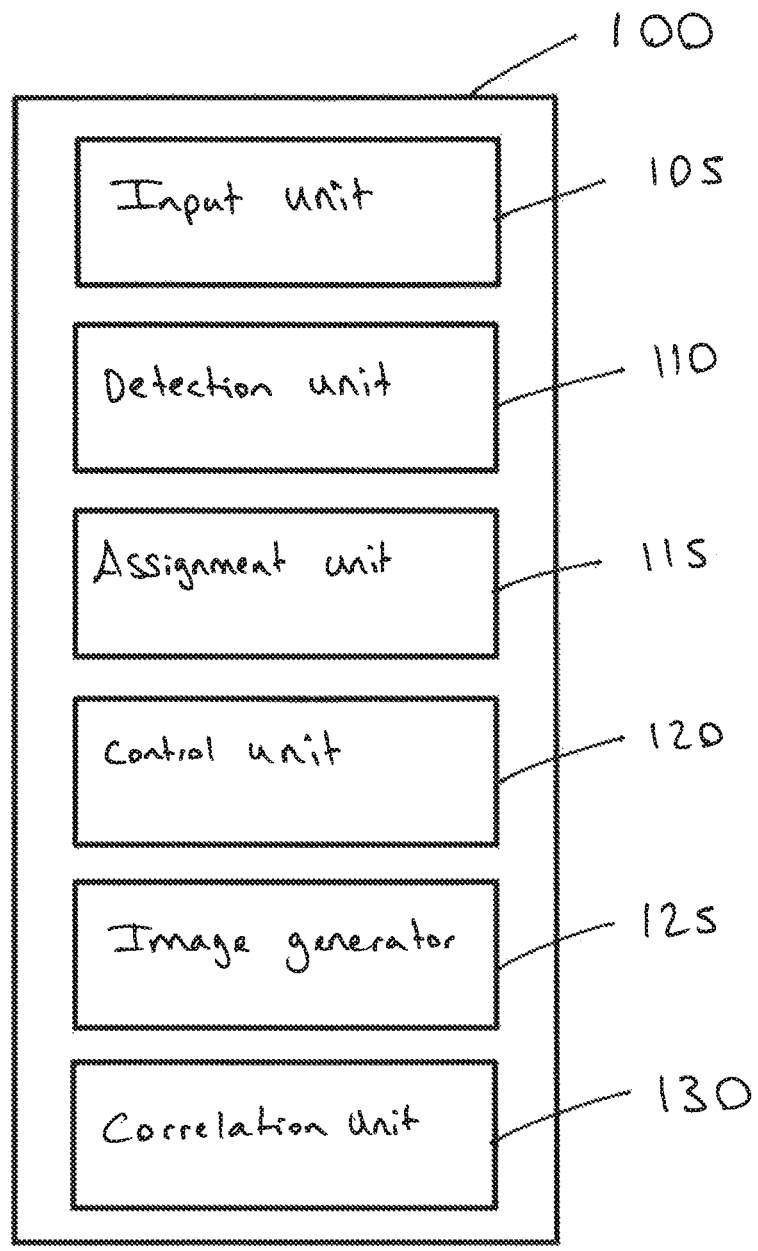
FIG. 5 is a schematic diagram illustrating another apparatus adapted to obtain data from a computer game.

In embodiments of the disclosure, determining the position of the at least one avatar-status box with respect to the first avatar comprises: providing, to a correlation unit trained to determine correlations between avatar poses and avatar-status boxes, an input comprising at least data indicative of the pose of the avatar; and obtaining from the correlation unit data indicative of a position of the at least one avatar-status box with respect to the avatar, responsive to that input. The correlation unit may be provided separate to the apparatus 100 such that the apparatus 100 communicates with the correlation unit via a wired or wireless communication (such as WiFi® or Bluetooth® link). Alternatively, the correlation unit may be provided as part of the apparatus 100 as illustrated in FIG. 5. Referring to FIG. 5, the detection circuitry 110 can detect a pose of the avatar according to the principles outlined above, and the control unit 120 can be configured to provide data indicative of the pose of the avatar to the correlation unit 130. The correlation unit 130 is trained to correlate avatar poses with avatar-status boxes. By providing an input to the correlation unit 130 comprising data indicative of the pose of the avatar, the correlation unit 130 can generate data indicative of a position of at least one avatar-status box with respect to the avatar. For example, the correlation unit 130 may store a model trained to correlate avatar poses with avatar-status boxes, such that correlation unit 130 can output avatar-status box position information in response to receiving information indicative of an avatar pose, wherein the avatar-status box position information is determined based on previous relationships between avatar poses and avatar-status boxes observed in one or more video games when training the model.

In embodiments of the disclosure, determining the position of the at least one avatar-status box with respect to the first avatar comprises: providing, to the correlation unit 130 trained to determine correlations between avatar poses and avatar-status boxes, supplementary data relating to an in-game interaction of the avatar with an element of the video game, the supplementary data indicative of one or more selected from the list consisting of:

i. the pose of the first avatar corresponding to the in-game interaction ii. a pose of a second avatar corresponding to the in-game interaction iii. a score indicator included in a region of the video image; and iv. a level of brightness associated with a region of the video image.

During gameplay avatars can interact with various elements of the in-game environment on the basis of avatar-status boxes defined by the executable program. Specifically, an avatar can interact with an element of the video game in dependence upon whether an avatar-status box associated with the avatar intersects an avatar-status box of another avatar or a status-box of another interactive element in the video game. The number of ways in which each avatar may interact with the in-game environment is determined based on the number of avatar-status boxes associated with the avatar and the classification of those avatar-status boxes. Whilst the types of avatar interactions may vary widely, in-game interactions are typically characterised by an update to the video image or an audio signal associated with the video image. An in-game interaction may be thus be characterised by an on-screen update including a flash of light, a change in a score indicator (e.g. status bar) or a recoil of an avatar's body, for example. Similarly, audio signals output as a result of the execution of the video game may also provide an indication of an in-game interaction. For example, audio sounds such as a crash or a bang may also accompany an in-game interaction and can thus be used to determine the occurrence of an in-game interaction. The supplementary data relating to the in-game interaction can thus provide an indication of a property of the in-game interaction. The supplementary data relating to the in-game interaction can be provided to the correlation unit 130. The correlation unit 130 can thus determine a position of at least one avatar-status box with respect to the avatar based on the detected pose of the avatar and the supplementary data.

Figure 6:
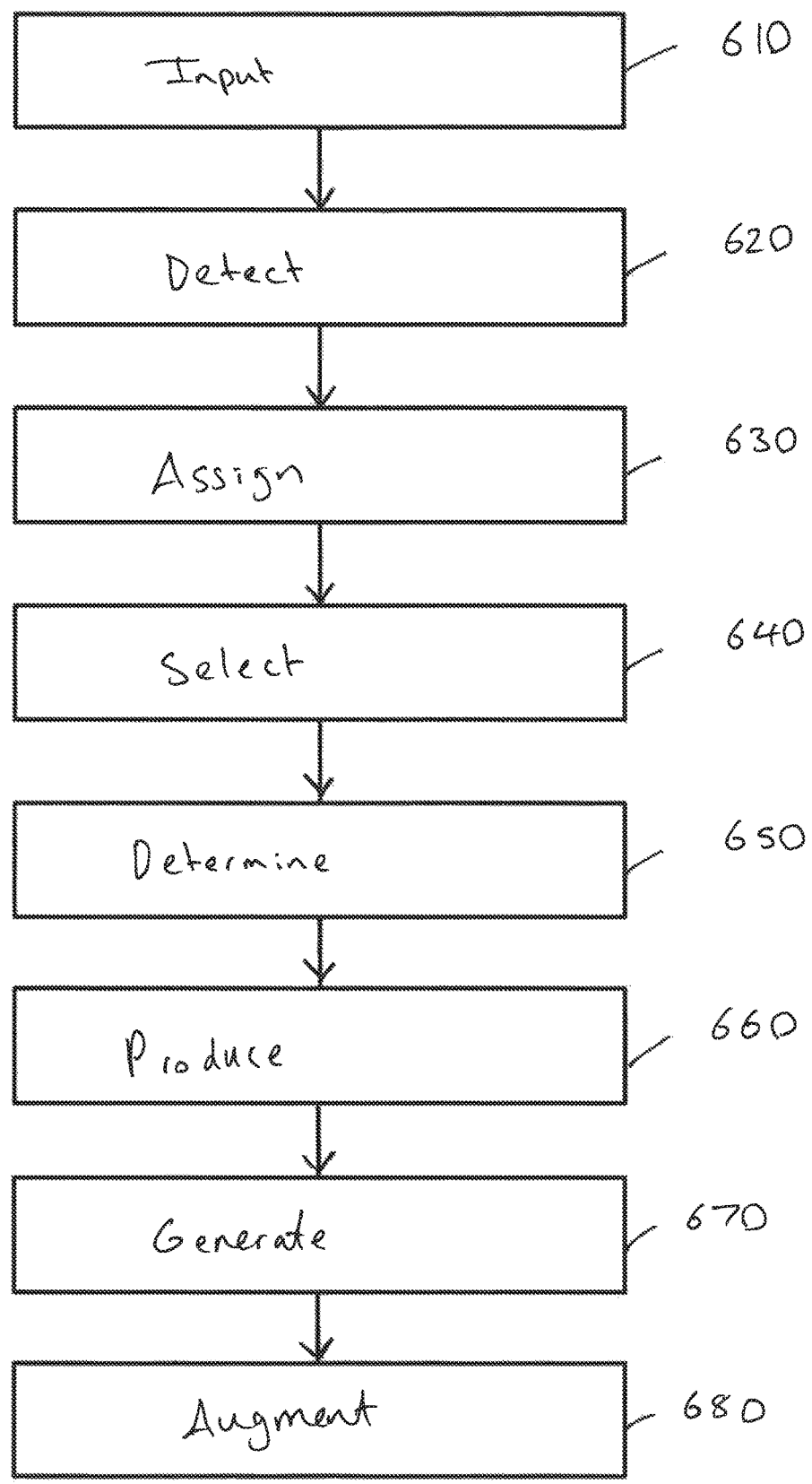
FIG. 6 is a schematic flowchart illustrating a method of obtaining data from a computer game.

Referring to FIG. 6, there is provided a schematic flowchart in respect of a method of obtaining data from a video game, comprising:

inputting (at a step 610) a video image of the video game comprising at least one avatar;

detecting (at a step 620) an in-game interaction of the avatar with an element of the video game and detecting a pose of the avatar corresponding to the in-game interaction;

assigning (at a step 630) one or more avatar-status boxes to one or more portions of the avatar;

selecting (at a step 640) at least one of the avatar-status boxes as being associated with the in-game interaction using the correlation between avatar poses and avatar-status boxes; and determining (at a step 650), based on the pose of the avatar, a position of the at least one avatar-status box with respect to the avatar using a correlation between avatar poses and avatar-status boxes;

producing (at a step 660) avatar-status data for the avatar indicative of the position of the at least one avatar-status box with respect to the avatar in the video image;

generating (at a step 670) one or more indicator images for the avatar in accordance with the avatar-status data; and augmenting (at a step 680) the video image of the video game comprising at least the avatar with one or more of the indicator images in response to the pose of the avatar.

In embodiments of the disclosure, the detection unit 110 can be configured to detect an in-game interaction based on a score indicator included in a region of the video image, and/or a level of brightness associated with a region of the video image and/or a property of an audio signal associated with the video image. As well as detecting an in-game event, the avatar pose corresponding to the in-game interaction can also be detected. Information indicative of a property of the in-game interaction and the avatar pose corresponding to the in-game event can be provided to the correlation unit 130. Using this information the correlation unit 130 can select one of the avatar-status boxes assigned to the avatar and determine a position for the avatar-status box.

For example, at the time of the in-game interaction the avatar pose may indicate that the avatar's right (or left) arm is protruding away from the avatar's body. This provides an indication that the in-game interaction involves an avatar-status box assigned to the avatar's right arm. The information relating to the avatar pose and the in-game interaction can thus be used to select the avatar-status box assigned to the avatar's right arm, and information indicative of a position of the avatar-status box with respect to the avatar's right arm can be obtained from the correlation unit 130. Using the information indicative of the in-game interaction, the correlation unit 130 can also determine a classification of the avatar-status box associated with the in-game interaction. For example, when the information related to the in-game interaction indicates that the avatar suffers damage as a consequence of the in-game interaction, the correlation unit 130 may determine that the avatar-status box has a hurt-box classification. Alternatively, when the information related to the in-game interaction indicates that the avatar inflicts damage as a consequence of the in-game interaction, the correlation unit 130 may determine that the avatar-status box has a hit-box classification. By providing, to the correlation unit 130 trained to determine correlations between avatar poses and avatar-status boxes, supplementary data relating to the in-game interaction of the avatar the correlation unit 130 may determine a position and a categorisation of the avatar-status box assigned to a portion of an avatar.

Figure 7:
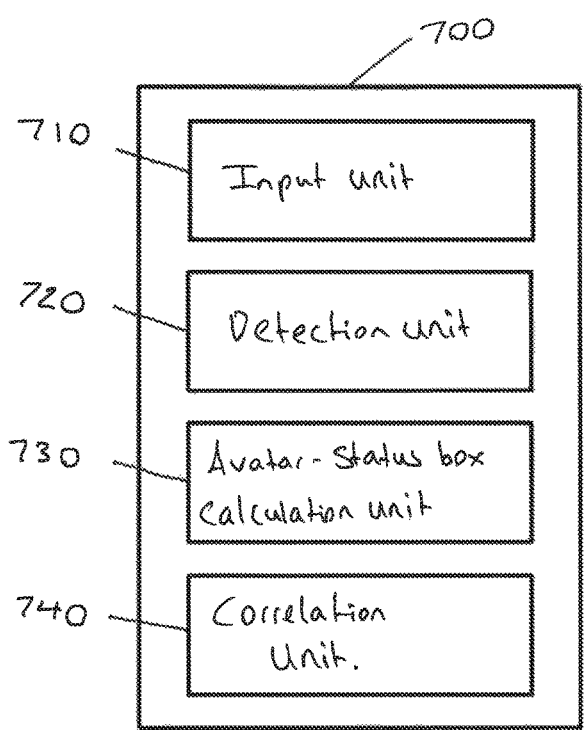
FIG. 7 is a schematic diagram illustrating an apparatus adapted to train a correlation unit to correlate avatar poses and avatar-status boxes.

FIG. 7 illustrates an apparatus adapted to train a correlation unit to correlate avatar poses and avatar-status boxes. In embodiments of the disclosure, an apparatus 700 adapted to correlate avatar poses and avatar-status boxes comprises: an input unit 710 configured to obtain a sequence of video images of a video game comprising at least a first avatar and a second avatar; a detection unit 720 configured to detect an in-game interaction between the first avatar and the second avatar indicative of an intersection between a first avatar-status box associated with the first avatar and a second avatar-status box associated with the second avatar and to detect an avatar pose for the first avatar and the second avatar corresponding to the in-game interaction; an avatar-status box calculation unit 730 configured to determine, for the in-game interaction, a position of the first avatar-status box with respect to the first avatar and a position of a second avatar-status box with respect to the second avatar; and a correlation unit 740 configured to store a model defining a correlation between avatar poses and avatar-status boxes and to correlate at least one of the position of the first avatar-status box with the pose of the first avatar and the position of the second avatar-status box with the pose of the second avatar, in which the correlation unit is configured to adapt the model in response to the correlation for at least one of the first avatar and the second avatar.

The input unit 710 receives the sequence of video images from a games machine, such as the game machine 90 illustrated in FIG. 2. The video images including at least the first avatar and the second avatar can be used by the apparatus 700 to observe various in-game interactions between the first avatar and the second avatar, where an in-game interaction occurs when an avatar-status box of the first avatar intersects or collides with an avatar-status box of the second avatar.

The detection unit 720 can detect in-game interactions as they occur by detecting changes in the properties of the video image (e.g. a change in a score indicator or a change in brightness of a given region in the video image or a recoil of an avatar's body). In addition, the detection unit 720 can detect an avatar pose of at least one of the avatar's at the time of the in-game interaction so as to generate avatar pose information that is associated with the in-game interaction.

By analysing the sequence of video images and observing the various in-game interactions between the first avatar and the second avatar, the apparatus 700 can detect the different avatar poses corresponding to the in-game interactions and determine which avatar poses correspond to which types of in-game interaction. By observing the various in-game interactions, the apparatus 700 can determine when two respective avatar-status boxes intersect or collide and can thus determine a position of each avatar-status box at the time of the in-game interaction. By detecting the avatar pose corresponding to the in-game interaction, the apparatus 700 can thus associate the avatar pose at the time of the in-game interaction with the position of the avatar-status box. Therefore, for a given in-game interaction, the apparatus 700 can determine a position of the two or more avatar-status boxes involved in the in-game interaction and a position of one avatar-status box with respect to the avatar pose of the first avatar can be determined and a position of a position of the other avatar-status box with respect to the avatar pose of the second avatar can be determined. In this way, the apparatus 700 can train a machine learning system using the observed in-game interactions and detected avatar poses corresponding to the in-game interactions to correlate avatar-status boxes with avatar poses. The machine learning system may be a neural network such as a 'deep learning' network, or a Baysean expert system, or any suitable scheme operable to learn a correlation between a first set of data points and a second set of data points, such as a genetic algorithm, a decision tree learning algorithm, an associative rule learning scheme, or the like.

The avatar-status box calculation unit 730 can determine, for an in-game interaction, a position of a first avatar-status box with respect to the first avatar and a position of a second avatar-status box with respect to the second avatar, and calculations performed for multiple in-game interactions can be used to train a machine learning system to correlate avatar poses with positions of avatar-status boxes. The correlation unit 740 can store a model defining a correlation between avatar poses and avatar-status boxes. In response to detecting an in-game interaction, information indicative of the properties of the in-game interaction (e.g. which types of avatar-status box are involved in the in-game interaction) and information indicative of at least one avatar pose corresponding to the interaction can be provided as an input to the model. The correlation unit 740 can thus adapt the model in response to the correlation between the avatar pose and the avatar-status box for the in-game interaction. The model can be adapted in response to the properties of the in-game interactions observed by the apparatus 700 to correlate avatar poses with avatar-status boxes. The model stored by the correlation unit 740 can then be used for correlating a given avatar pose with one or more avatar-status boxes. Therefore, an input comprising data indicative of an avatar pose may be provided as an input to the correlation unit 730 and, based on the correlations between avatar poses and avatar-status boxes defined by the model, the model can output a position of one or more avatar-status boxes associated with that avatar pose. This provides an example of a model-based approach, in which a model defining a correlation between avatar poses and avatar-status boxes is inferred from video images of a computer game without having to manually access and reverse engineer source code for an executable program associated with the computer game. Model-based reinforcement learning techniques allow extraction of the relevant information for inferring a model such that the model can be inferred without having to reverse engineer source code of an executable program for machine learning purposes. Using model-based reinforcement learning techniques, the process of training the correlation unit 740 to correlate avatar poses and avatar-status boxes can be performed to infer and adapt a model defining a correlation between avatar poses and avatar-status boxes, and the amount of time required to train the correlation unit can be reduced compared to a model-free reinforcement learning approach.

Figure 8:
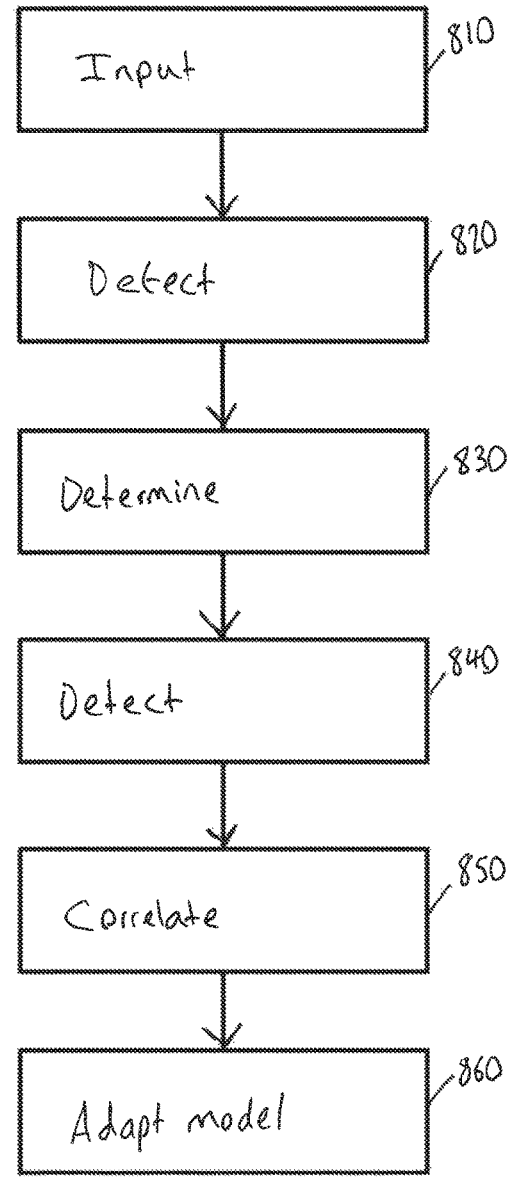
FIG. 8 is a schematic flowchart illustrating a method of training a correlation processor to determine correlations between avatar poses and avatar-status boxes.

Referring to FIG. 8, there is provided a schematic flowchart in respect of a method of training a correlation unit to determine correlations between avatar poses and avatar-status boxes, comprising:

inputting (at a step 810) a sequence of video images of a video game comprising at least a first avatar and a second avatar;

detecting (at a step 820) an in-game interaction between the first avatar and the second avatar indicative of an intersection between a first avatar-status box associated with the first avatar and a second avatar-status box associated with the second avatar;

determining (at a step 830), for the in-game interaction, a position of the first avatar-status box with respect to the first avatar and a position of a second avatar-status box with respect to the second avatar;

detecting (at a step 840), for the in-game interaction, a pose for the first avatar and a pose for the second avatar;

correlating (at a step 850) at least one of the position of the first avatar-status box with the pose of the first avatar and the position of the second avatar-status box with the pose of the second avatar; and adapting (at a step 860) a model defining a correlation between avatar poses and avatar-status boxes in response to the correlation for at least one of the first avatar and the second avatar.

The method of training a correlation unit to determine correlations between avatar poses and avatar-status boxes illustrated in FIG. 8 can be performed by an apparatus such as the apparatus 700 illustrated in FIG. 7 operating under the control of computer software.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that references herein to 'obtaining data' from a video game do not necessarily mean obtaining/extracting data from the videogame itself and/or extracting/obtaining data used by the videogame; as noted previously herein, games may not permit, or easily operate to allow, useful access to desired data such as status box positions. Furthermore, the techniques described herein are applicable to video recordings of a video game, for example hosted on a website, for which the specific runtime of the game no longer exists and hence from which no data can be directly obtained. Hence 'obtaining data' from a videogame may be more generally understood as inferring or deriving information about a videogame from image (and optionally audio) data output by the videogame, for example using the techniques described herein.

It will be apparent that numerous modifications and variations of the present disclosure are possible in light of the above teachings. It is therefore to be understood that within the scope of the appended claims, the technology may be practised otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of obtaining data from a video game, comprising:
    inputting a video image of the video game comprising at least one avatar;
    detecting a pose of the avatar in the video image;
    assigning one or more avatar-status boxes to one or more portions of the avatar;
    determining, based on the pose of the avatar, a position of at least one avatar-status box with respect to the avatar using a correlation between avatar poses and avatar-status boxes;
    producing avatar-status data for the avatar indicative of the position of the at least one avatar-status box with respect to the avatar in the video image;
    generating one or more indicator images for the avatar in accordance with the avatar-status data; and
    augmenting the video image of the video game comprising at least the avatar with one or more of the indicator images in response to the pose of the avatar; and
    in which the step of determining the position of the at least one avatar-status box with respect to the avatar comprises:
    providing, to a correlation unit trained to determine correlations between avatar poses and avatar-status boxes, an input comprising at least data indicative of the pose of the avatar; and
    obtaining from the correlation unit data indicative of a position of the at least one avatar-status box with respect to the avatar, responsive to that input, and
    each avatar-status box has a corresponding classification indicative of a type of in-game interaction associated with the avatar-status box.

2. A method according to claim 1, in which the step of detecting the pose of the avatar comprises:
    analysing the video image of the video game using an algorithm trained on skeletal models; and
    selecting one avatar pose from a plurality of avatar poses based on one or more of:
    an angle of a limb of the avatar with respect to a torso of the avatar;
    a degree of extension of the limb of the avatar; and
    a distance between a position of a centre of gravity of the avatar and a position of a predetermined portion of the limb of the avatar.

3. A method according to claim 1, comprising:
    augmenting the video image with a first set of indicator images in response to a first avatar pose and augmenting the video image with a second set of indicator images in response to a second avatar pose, in which each indicator image corresponds to one avatar-status box.

4. A method according to claim 1, comprising:
  detecting an in-game interaction of the avatar with an element of the video game and detecting the pose of the avatar corresponding to the in-game interaction;
  selecting at least one of the avatar-status boxes as being associated with the in-game interaction using the correlation between avatar poses and avatar-status boxes; and
  determining, based on the pose of the avatar, a position of the at least one avatar-status box with respect to the avatar using the correlation between avatar poses and avatar-status boxes.

5. A method according to claim 1, in which the step of determining the position of the at least one avatar-status box with respect to the avatar comprises:
  providing, to a correlation unit trained to determine correlations between avatar poses and avatar-status boxes, supplementary data relating to an in-game interaction of the avatar with an element of the video game, the supplementary data indicative of one or more of:
  i. the pose of the avatar corresponding to the in-game interaction;
  ii. a pose of another avatar corresponding to the in-game interaction;
  iii. a score indicator included in a region of the video image; and
  iv. a level of brightness associated with a region of the video image.

6. A method according to claim 1, in which each avatar-status box is assigned to a portion of the avatar.

7. A method according to claim 1, in which the classification of an avatar-status box is one or more of:
  i. a hit box indicative that a portion of an avatar pose can inflict an in-game hit-interaction on the element of the video game;
  ii. a hurt box indicative that a portion of an avatar pose can receive an in-game hit-interaction from the element of the video game;
  iii. an armour box indicative that a portion of an avatar pose can not be hurt;
  iv. a throw box indicative that a portion of an avatar pose can engage with a target to throw the target;
  v. a collision box indicative that a portion of an avatar pose can collide with a target;
  vi. a proximity box indicative that a portion of an avatar pose can be blocked by an opponent; and
  vii. a projectile box indicative that a portion of an avatar pose comprises a projectile.

8. A method according to claim 1, in which the step of assigning one or more avatar-status boxes to the avatar comprises assigning at least a first avatar-status box and a second avatar-status box to a limb of the avatar, in which the first avatar-status box has a first classification and the second avatar-status box has a second classification, the first classification being different to the second classification.

9. A method according to claim 8, in which a classification of the first avatar-status box indicates that the first avatar-status box is a hit box and a classification of the second avatar status box indicates that the second avatar-status box is a hurt box.

10. A method according to claim 1, wherein the correlation unit is trained in accordance with actions, comprising:
  inputting a sequence of video images of a video game comprising at least a first avatar and a second avatar;
  detecting an in-game interaction between the first avatar and the second avatar indicative of an intersection between a first avatar-status box associated with the first avatar and a second avatar-status box associated with the second avatar;
  determining, for the in-game interaction, a position of the first avatar-status box with respect to the first avatar and a position of a second avatar-status box with respect to the second avatar;
  detecting, for the in-game interaction, a pose for the first avatar and a pose for the second avatar;
  correlating at least one of the position of the first avatar-status box with the pose of the first avatar and the position of the second avatar-status box with the pose of the second avatar; and
  adapting a model defining a correlation between avatar poses and avatar-status boxes in response to the correlation for at least one of the first avatar and the second avatar.

11. An apparatus adapted to obtain data from a video game, comprising:
  an input unit configured to obtain a video image of the video game comprising at least one avatar;
  a detection unit configured to detect a pose of the avatar in the video image;
  an assignment unit configured to assign one or more avatar-status boxes to one or more portions of the avatar;
  a control unit configured to determine, based on the pose of the avatar, a position of at least one avatar-status box with respect to the avatar using a correlation between avatar poses and avatar-status boxes, and to produce avatar-status data for the avatar indicative of the position of the at least one avatar-status box with respect to the avatar; and
  an image generator configured to generate one or more indicator images for the avatar in accordance with the avatar-status data, and to augment the video image of the video game comprising at least the avatar with one or more of the indicator images in response to the pose of the avatar; and
  in which the control unit is configured to:
  provide, to a correlation unit trained to determine correlations between avatar poses and avatar-status boxes, an input comprising at least data indicative of the pose of the avatar; and
  obtain from the correlation unit data indicative of a position of the at least one avatar-status box with respect to the avatar, responsive to that input, and wherein
  each avatar-status box has a corresponding classification indicative of a type of in-game interaction associated with the avatar-status box.

12. The apparatus of claim 11, further comprising a training apparatus adapted to train the correlation unit to correlate avatar poses and avatar-status boxes, comprising:
  an input unit configured to obtain a sequence of video images of a video game comprising at least a first avatar and a second avatar;
  a detection unit configured to detect an in-game interaction between the first avatar and the second avatar indicative of an intersection between a first avatar-status box associated with the first avatar and a second avatar-status box associated with the second avatar and to detect an avatar pose for the first avatar and the second avatar corresponding to the in-game interaction;
  an avatar-status box calculation unit configured to determine, for the in-game interaction, a position of the first avatar-status box with respect to the first avatar and a position of a second avatar-status box with respect to the second avatar; and the correlation unit configured to store a model defining a correlation between avatar poses and avatar-status boxes and to correlate at least one of the position of the first avatar-status box with the pose of the first avatar and the position of the second avatar-status box with the pose of the second avatar, in which the correlation unit is configured to adapt the model in response to the correlation for at least one of the first avatar and the second avatar.

\* \* \* \* \*